US010890516B2

United States Patent
Yang et al.

(10) Patent No.: US 10,890,516 B2
(45) Date of Patent: Jan. 12, 2021

(54) FORWARD SCATTER IN PARTICULATE MATTER SENSOR

(71) Applicant: Honeywell International Inc., Morris Plains, NJ (US)

(72) Inventors: Ouyang Yang, Shanghai (CN); Lu Tian, Suzhou (CN); Chen Feng, Snohomish, WA (US); Lu Jinnan, Suzhou (CN); Rui Hou, Suzhou (CN); Tao Chen, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/143,438

(22) Filed: Sep. 26, 2018

(65) Prior Publication Data

US 2019/0025180 A1    Jan. 24, 2019

Related U.S. Application Data

(63) Continuation of application No. 15/423,302, filed on Feb. 2, 2017, now abandoned.

(51) Int. Cl.
*G01N 15/06* (2006.01)
*G01N 21/53* (2006.01)
(Continued)

(52) U.S. Cl.
CPC .............. *G01N 15/06* (2013.01); *G01N 21/53* (2013.01); *G01N 21/534* (2013.01);
(Continued)

(58) Field of Classification Search
CPC .... G01N 15/06; G01N 15/1436; G01N 15/02; G01N 15/0205; G01N 21/53;
(Continued)

(56) References Cited

U.S. PATENT DOCUMENTS 3,248,551 A * 4/1966 Frommer ............ G01N 15/1434
250/574
3,835,315 A    9/1974 Gravitt, Jr.
(Continued)

FOREIGN PATENT DOCUMENTS

CN    102564928 B    3/2013
CN    204594848 U    8/2015

OTHER PUBLICATIONS

ProScatter™—Forward Scatter Particulate emission technology for EN 14181, US EPA PS11 PCME, 1 page [retrieved Oct. 21, 2016]. Retrieved from the Internet: http://www.pcme.com/technologies/proscatter-forward-scatter.

*Primary Examiner* — Hoa Q Pham
(74) *Attorney, Agent, or Firm* — Seager Tutte & Wickhem LLP

(57) ABSTRACT

Embodiments relate generally to systems and methods for detecting particulate matter in the air. A particulate matter sensor may comprise an airflow channel; a light source configured to pass light through the airflow channel; an airflow generator configured to generate airflow into the airflow channel; a waveguide configured to direct light from the light source after it passes through the airflow channel and scatters off of particulate matter within the airflow channel; a photodiode configured to receive light scattered by the waveguide; and a computing device coupled to the photodiode having a processor and a memory storing instructions which, when executed by the processor, determines a mass concentration of particles in the airflow channel based on an output of the photodiode.

14 Claims, 6 Drawing Sheets

(51) Int. Cl.
*G01N 21/47* (2006.01)
*G01N 15/00* (2006.01)

(52) U.S. Cl.
CPC ............... *G01N 2015/0046* (2013.01); *G01N 2015/0693* (2013.01); *G01N 2021/4707* (2013.01); *G01N 2201/0612* (2013.01); *G01N 2201/08* (2013.01); *G01N 2201/12* (2013.01)

(58) Field of Classification Search
CPC ... G01N 2201/0612; G01N 2015/0693; G01N 9/24; G01N 25/0211; G01N 2021/4742
USPC .................... 356/335–343, 73; 250/574–576
See application file for complete search history.

(56) References Cited

U.S. PATENT DOCUMENTS

| | | | | |
|---|---|---|---|---|
| 4,175,865 A | | 11/1979 | Horvath et al. | |
| 4,523,841 A | * | 6/1985 | Brunsting | G01N 15/1436 356/340 |
| 4,606,636 A | * | 8/1986 | Monin | G01N 15/1436 356/318 |
| 4,636,075 A | | 1/1987 | Knollenberg | |
| 4,739,177 A | | 4/1988 | Borden | |
| 4,914,310 A | | 4/1990 | Jarofski | |
| 5,043,591 A | * | 8/1991 | Ludlow | G01N 15/1431 250/574 |
| 5,461,476 A | | 10/1995 | Fournier | |
| 5,467,189 A | * | 11/1995 | Kreikebaum | G01N 15/0205 250/574 |
| 5,767,967 A | * | 6/1998 | Yufa | G01N 15/0205 250/458.1 |
| 6,456,439 B1 | * | 9/2002 | Mandella | G02B 21/02 359/642 |
| 6,606,157 B1 | | 8/2003 | Kaye et al. | |
| 6,798,508 B2 | | 9/2004 | Kramer | |
| 7,111,496 B1 | | 9/2006 | Lilienfeld et al. | |
| 7,274,445 B1 | * | 9/2007 | Meeks | G01N 21/9501 250/201.3 |
| 7,907,269 B2 | * | 3/2011 | Meeks | G01N 21/474 250/372 |
| 8,049,888 B2 | * | 11/2011 | Goehde | G01N 15/1436 250/483.1 |
| 8,427,641 B2 | * | 4/2013 | Babico | G01J 3/02 356/336 |
| 8,477,307 B1 | * | 7/2013 | Yufa | G01N 21/658 356/337 |
| 9,134,230 B2 | * | 9/2015 | Jiang | G01N 21/6486 |
| 9,354,164 B2 | * | 5/2016 | Yamana | G01N 21/3586 |
| 2004/0075056 A1 | * | 4/2004 | Bell | G08B 17/107 250/341.1 |
| 2009/0039249 A1 | * | 2/2009 | Wang | G01N 15/0205 250/287 |
| 2009/0242799 A1 | * | 10/2009 | Bolotin | G01N 15/1459 250/459.1 |
| 2010/0045982 A1 | | 2/2010 | Tsuneta et al. | |
| 2010/0288921 A1 | * | 11/2010 | Wang | G01N 15/0205 250/287 |
| 2014/0247450 A1 | * | 9/2014 | Han | G01N 15/0211 356/338 |

* cited by examiner

FORWARD SCATTER IN PARTICULATE MATTER SENSOR

This application is a continuation of co-pending U.S. patent application Ser. No. 15/423,302, filed Feb. 2, 2017, and entitled "FORWARD SCATTER IN PARTICULATE MATTER SENSOR", which is incorporated herein by reference.

BACKGROUND

A particulate matter sensor or dust sensor may be used to determine a quality of air, for example in a quality of air that is input to and/or output from an air cleaner. In some industrialized regions, environmental air may have high concentrations of particulate matter of different sizes. If the concentration of such particulate matter is high enough, it may be deleterious to human health. Consumers may wish to purchase and install air cleaners for the residences to improve the quality of air breathed in the home. Such consumer grade air cleaners may desirably be modestly priced and compact in size.

SUMMARY

In an embodiment, a particulate matter sensor may comprise an airflow channel; a light source configured to pass light through the airflow channel; an airflow generator configured to generate airflow into the airflow channel; a waveguide configured to direct light from the light source after it passes through the airflow channel and scatters off of particulate matter within the airflow channel; a photodiode configured to receive light scattered by the waveguide; and a computing device coupled to the photodiode having a processor and a memory storing instructions which, when executed by the processor, determines a mass concentration of particles in the airflow channel based on an output of the photodiode.

In an embodiment, a method for determining the concentration of particulate matter within an environment may comprise allowing ambient air to enter a particulate matter sensor; generating an updraft into an airflow channel within the particulate matter sensor; powering a light source within the particulate matter sensor; directing the light source through the airflow channel; receiving, by a waveguide, scattered light that is scattered by particulate matter within the airflow channel; directing, by the waveguide, the scattered light toward a photodiode; and determining a mass concentration of particles in the airflow channel based on an output of the photodiode.

In an embodiment, a particulate matter sensor may comprise an airflow channel; a laser diode; a housing configured to contain the elements of the sensor; an airflow generator configured to generate airflow into the airflow channel; a photodiode configured to receive light produced by the laser diode; a waveguide positioned between the laser diode and the photodiode, configured to direct light scattered by particulate matter within the airflow channel toward the photodiode; and a computing device coupled to the photodiode having a processor and a memory storing instructions which, when executed by the processor, determines a mass concentration of particles in the airflow channel based on an output of the photodiode.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
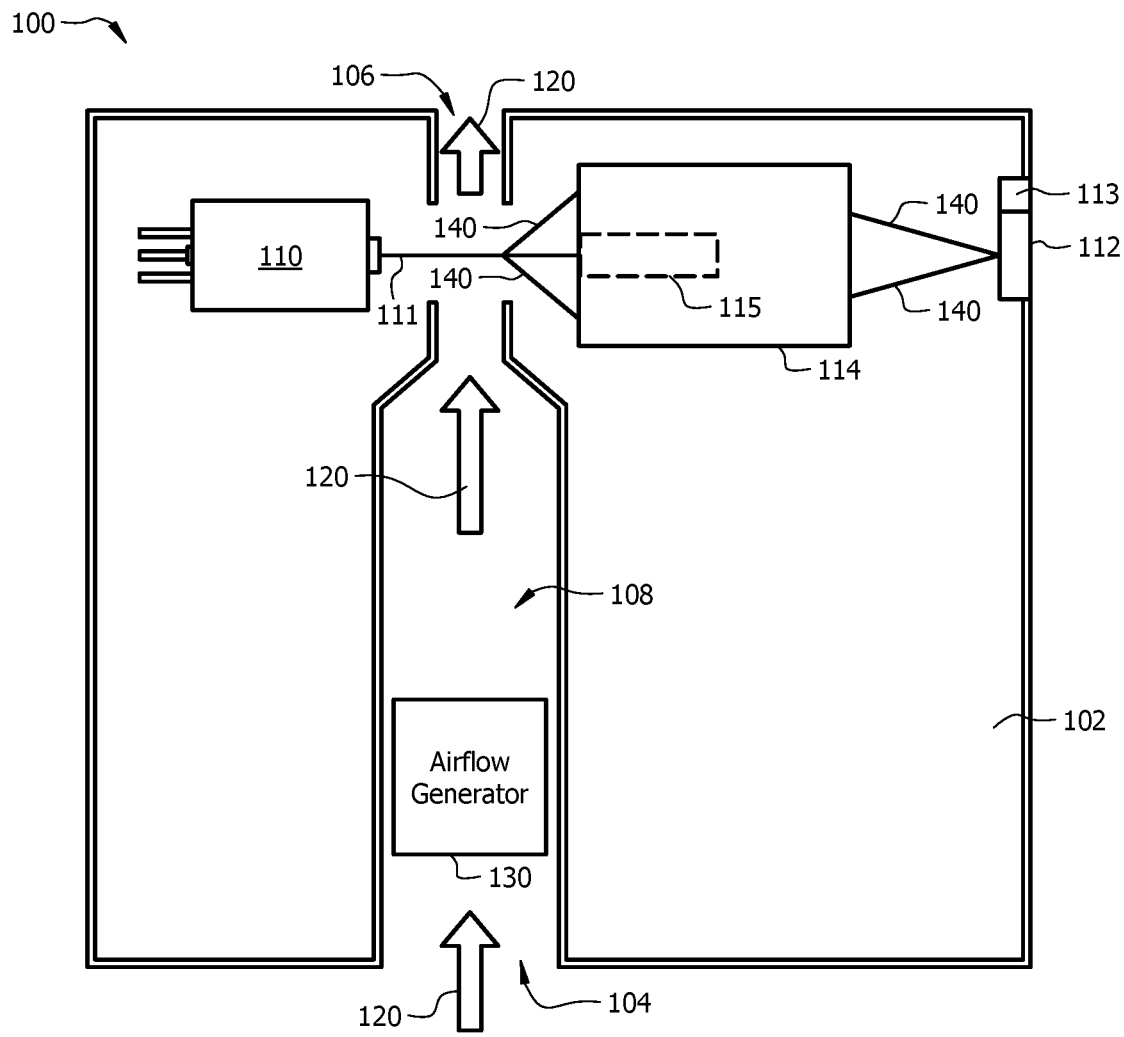
FIG. 1 illustrates a schematic diagram of a particulate matter sensor according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for directing scattered light toward a photodiode within a particulate matter sensor. Typical particulate matter sensors may use a light source and a fan structure to direct airflow through the light source. The scattered light detected by the photodiode may be scattered by particulate matter in an airflow pathway. One or more waveguides may direct the scattered light toward the photodiode.

Embodiments of the disclosure may relate to forward scattering of light scattered from particulate matter. Greater light scattering occurs in the forward direction and therefore should produce a stronger signal than a typical particulate matter sensor configured to detect scattered light at 90 degrees. However, the forward scatter signal produced is analog, requiring a slightly different signal analysis. This may be accomplished by a computing system within the sensor.

Utilizing the increased amount of scattered light that can be collected by forward scattering may generate a stronger, enhanced signal generated by the photodiode. The increased intensity may allow for smaller size particles to be detected by the sensor. The sensor may comprise a laser diode (or another similar light source), one or more waveguides (such as an ellipsoidal or spherical mirror), a photodiode detector, and walls and/or baffles within the sensor to ensure that the light is directed toward the intended scatter location.

FIG. 1 illustrates an exemplary particulate matter sensor 100 comprising a housing 102 with an airflow channel 108 through the housing 102. The airflow channel 108 may direct airflow 120 through the housing 102 and through a beam 111 from a laser diode 110 (or another light source). The airflow channel 108 is shown as a straight pathway, but in other embodiments, the airflow channel 108 may comprise angles or curves within the sensor housing 102. The beam 111 may be received by a photodiode 112, where any light scattered away by the particulate matter in the in the airflow 120 may reduce the beam 111 that is detected by the photodiode 112. Alternatively, the photodiode 112 may be configured to detect light that is scattered off of the particulate matter within the airflow 120. The photodiode 112 may comprise or be coupled to a computing device 113 configured to determine a mass concentration of particles in the airflow channel 108 based on an output of the photodiode.

In some embodiments, the sensor 100 may comprise one or more waveguides 114 configured to amplify the light that is directed toward the photodiode 112. The waveguide(s) 114 may optionally comprise a light trap 115 located in the path of the beam 111 produced by the laser diode 110. The laser diode 110 may be placed close to the scatter point (where the beam 111 contacts particulate matter in the airflow 120) and the light trap 115 to avoid scatter from other regions of the sensor 100. In some embodiments, the beam 111 produced by the laser diode may be collimated with a diameter of approximately 1 to 2 millimeters. The light trap 115 may comprise a tube shape configured to absorb the beam 111. In some embodiments, the light trap 115 may comprise a black tube located within the waveguide 114.

As shown in FIG. 1, scattered light 140 may bounce off of particulate matter in the airflow 120, wherein the scattered light 140 may be directed at an angle to the beam 111. This scattered light 140 may be captured by the waveguide 114, and may be directed toward the photodiode 112. Scattered light 140 may comprise light reflected off of particulate matter within a given angle from the beam 111 that is then directed toward the waveguide 114 and is scattered forward by the waveguide 114.

It may be desired for the photodiode 112 to only receive the light scattered off of the particulate matter. For this reason, the beam 111 produced by the laser diode 110 may be trapped and/or blocked from reaching the photodiode 112. As an example, a light trap 115 may be placed within the waveguide(s) 114, wherein the light trap 115 may contain the beam 111 and prevent it from reaching the photodiode 112. Additionally, the light trap 115 may be configured to prevent the beam 111 from reflecting back into the airflow channel 108.

The sensor 100 may comprise an airflow generator 130 configured to provide airflow 120 through the airflow channel 108. The airflow generator 130 may draw airflow 120 into the housing 102 via an inlet 104, where the airflow 120 may pass through the beam 111 of the laser diode 110, and may be directed out of the housing 102 via an outlet 106. The airflow generator 130 may comprise a mechanical airflow generator, such as a fan, a blade, and/or a flipper. The airflow generator 130 may comprise a conduction airflow generator. The airflow generator 130 may comprise any element that is configured to produce airflow through the airflow channel 108. As shown in FIG. 1, the airflow generator 130 may be located within the housing 102 of the sensor 100. Alternatively, the airflow generator 130 may be located external to the housing 102 of the sensor 100.

Figure 2A:
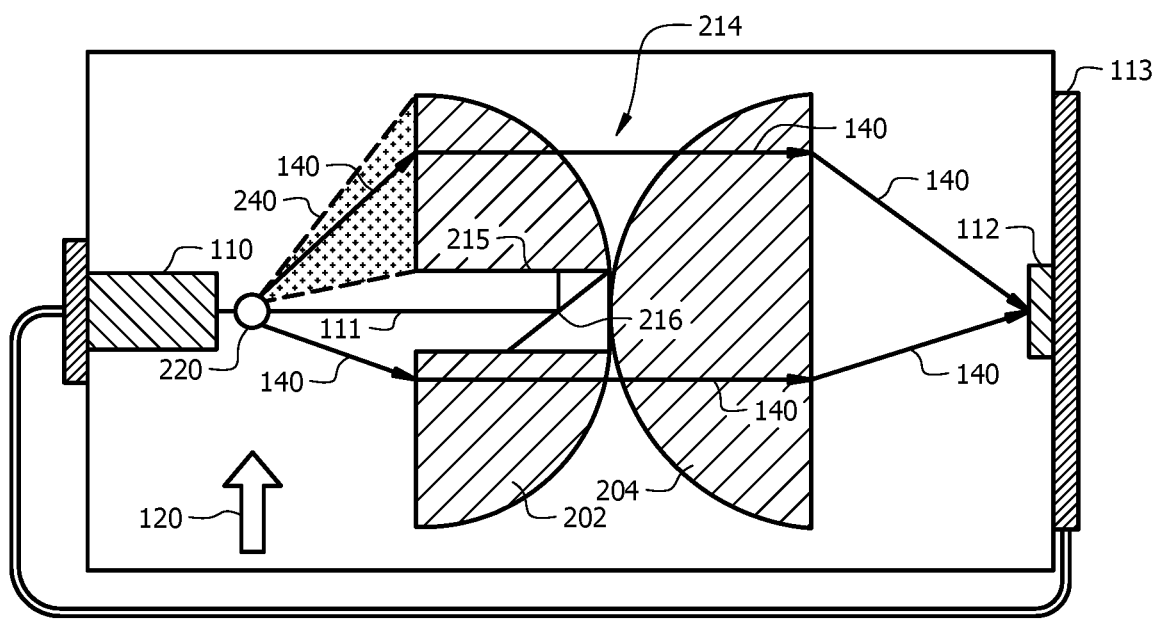
FIGS. 2A-2B illustrate a waveguide for use in a particulate matter sensor according to an embodiment of the disclosure.
Figure 2B:
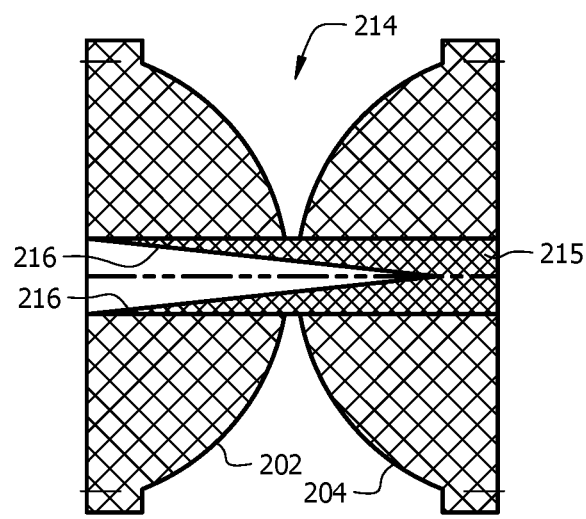

FIGS. 2A-2B illustrate exemplary embodiments of a waveguide 214 which may be similar to the waveguide(s) 114 described above. In the embodiment shown in FIGS. 2A-2B, the waveguide 214 may comprise a first condensing lens 202 and a second condensing lens 204. The first condensing lens 202 may be configured to receive scattered light 140 that is scattered off of particulate matter 220 in the airflow 120. The scattered light 140 received by the first condensing lens 202 may be within a range of angles indicated by the area 240. The scattered light 140 received by the first condensing lens 202 may be between approximately 10 to 40 degrees from the beam 111 produced by the laser diode 110. In some embodiments, the scattered light 140 received by the waveguide 214 may be at an angle greater than 5 degrees from the beam 111. In some embodiments, the scattered light 140 received by the waveguide 214 may be at an angle less than 90 degrees from the beam 111.

The scattered light 140 received by the first condensing lens 202 may be directed to the second condensing lens 204, where the second condensing lens 204 may direct the scattered light 140 to the photodiode 112. Therefore, the photodiode 112 may measure light that is scattered off of particulate matter 220 within the airflow 120.

The waveguide 214 may also comprise a light trap 215 located within the first condensing lens 202. The light trap 215 may be configured to prevent the beam 111 produced by the laser diode 110 from reaching the photodiode 112. In some embodiments, the light trap 215 may comprise one or more angled walls 216 configured to prevent the beam 111 from reflecting back into the pathway of the airflow 120.

FIG. 2B illustrates a detailed view of a waveguide 214. In some embodiments, the light trap 215 may extend through both the first condensing lens 202 and the second condensing lens 204. In some embodiments, the light trap 215 may comprise angled walls 216 forming a conical shape within the light trap 215. The conical shape may efficiently trap the beam 111 produced by the laser diode 112. In some embodiments, the interior angled walls 216 may comprise a light absorbing coating or material.

Figure 3:
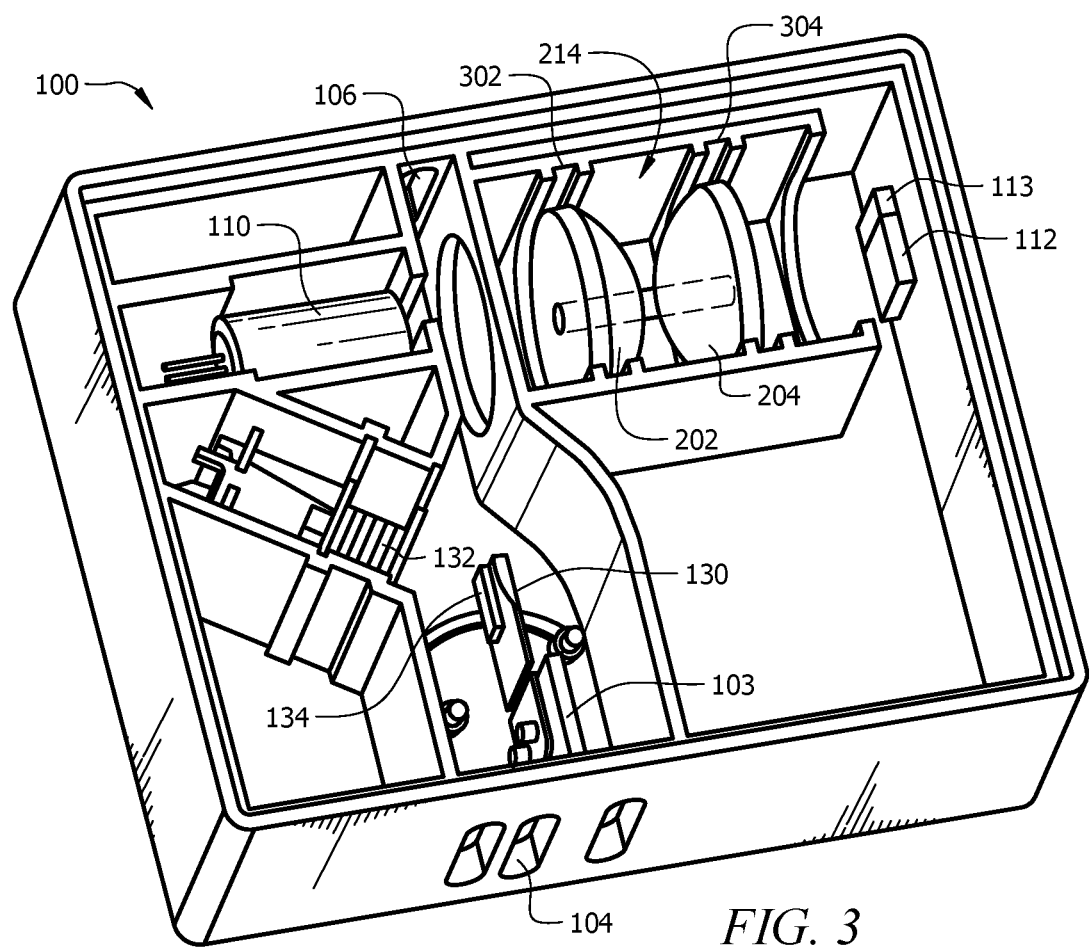
FIG. 3 illustrates a perspective view of a particulate matter sensor according to an embodiment of the disclosure.

FIG. 3 illustrates a perspective view of the sensor 100 with the top of the housing 102 removed, where the waveguide 214 and light trap 215 are incorporated into the sensor 100. The waveguide 214 may be located between the laser diode 110 and the photo diode 112. The waveguide 214 may be at least partially contained by walls within the housing 102. In some embodiments, grooves 302 and 304 may be configured to hold the lenses 202 and 204 in place within the housing 102. The grooves 302 and 304 as well as other walls within the housing 102 may be structured to reduce the contact area between the housing 102 and the active area on the surfaces of the waveguide 214. In other words, the housing 102 may be designed to hold the waveguide 214 in place without interfering with the light that is scattered through the waveguides 214.

As described above, the airflow channel 108 may be formed by walls within the housing 102. The inlet 104 may comprise one or more openings in the housing 102. The outlet 106 may comprise one or more openings in the housing 102.

Additionally, the sensor 100 may comprise a flipper 130 that may be controlled by a coil 132 located near the flipper 130. The flipper 130 may be moved back and forth on an axis, pulling airflow into the airflow channel 108 via the inlet 104. The airflow 120 may be forced through the airflow channel 108 toward the outlet 106, passing through the beam 111. The airflow channel 108 is shown as a straight pathway, but in other embodiments, the airflow channel 108 may comprise angles or curves within the sensor housing 102.

The coil 132 may be located within the housing 102, adjacent to the flipper 130. The flipper 130 may be located within the housing 102 near the inlet 104. In some embodiments, the flipper 130 may be located anywhere within the airflow channel 108. In some embodiments, the coil 132 may be located on one side of the airflow channel 108 while the additional waveguide 214 may be located on the opposite side of the airflow channel 108. This may prevent the coil 132 from interfering with the waveguides 114 and/or photodiode 112. Additionally, the coil 132 may be positioned such that the size of the housing 102 may be as small as possible while containing all of the elements described.

The flipper 130 may be attached to a wall or extended portion 103 of the housing 102. The flipper 130 may comprise a magnet 134 attached to and/or incorporated into the flipper 130. The flipper 130 may be controlled by a magnetic force generated by the electric coil 132. The coil 132 may generate alternating electric fields to push and pull the flipper 130 by applying attractive and repulsive forces to the magnet 134. One end of the flipper 130 may be secured to the housing 102, and the magnet 134 may be located on the unattached portion of the flipper 130.

In some embodiments, the flipper 130 can be biased in one direction by a spring or other biasing member (e.g., gravity, etc.). The coil 132 can then generate an attractive or repulsive force to move the flipper 130 against the bias force. The coil 132 can then cease generation of the attractive or repulsive force to allow the bias member to return the flipper 130 to the resting position. Repetition of this cycle can cause the flipper 130 to move back and forth within the airflow channel 108.

The movement of the flipper 130 may generate airflow 120 drawing it in through the inlet 104. The particulate matter in the airflow 120 may be detected via the laser diode 110 and the photodiode 112. The coil 132 may be configured to produce an electric field at a particular frequency to drive the magnet 134, and therefore the flipper 130, to swing back and forth. In some embodiments, the frequency produced by the coil may be a square wave at approximately 3.3V. In some embodiments, the frequency of the coil 132 may be controlled based on the determined airflow rate through the sensor 100. In some embodiments, the determined airflow rate can be determined using a correlation between the flipper movement speed and a flow rate, which can be determined using an equation, a look-up table, or another representation of the correlation. In the embodiment shown, the coil 132 may be located at an angle to the flipper 130, where the angle and position of the coil 132 may be adjusted and chosen based on the interaction between the coil 132 and the flipper 130, to provide the strongest and most reliable effect from the coil 132 on the flipper 130.

Figure 4A:
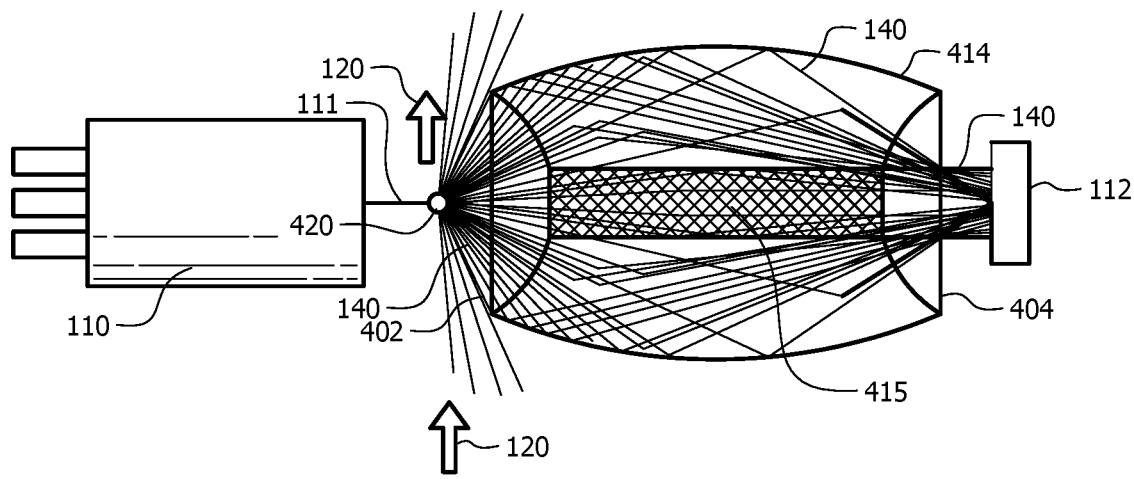
FIGS. 4A-4B illustrate a waveguide for use in a particulate matter sensor according to an embodiment of the disclosure.
Figure 4B:
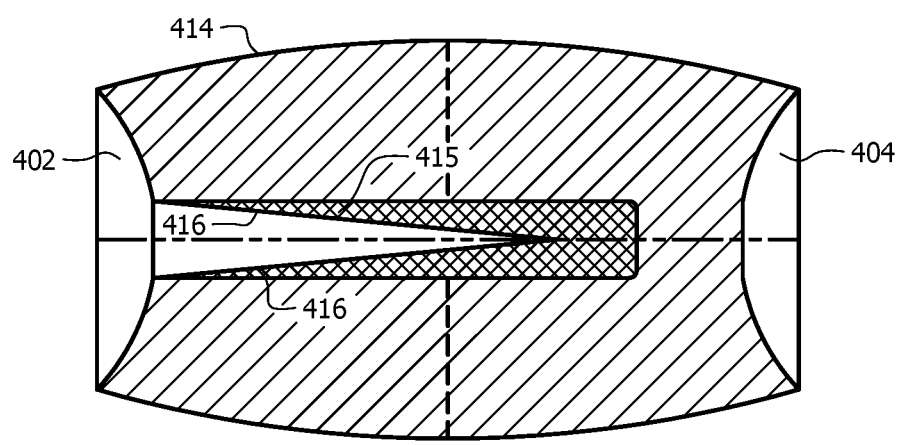

FIGS. 4A-4B illustrate an exemplary embodiment of a waveguide 414 which may be similar to the waveguide(s) 114 described above. In the embodiment shown in FIGS. 4A-4B, the waveguide 414 may comprise an ellipse mirror comprising two flat surfaces, wherein the flat surfaces function as an inlet 402 and outlet 404 of the waveguide 414.

The inlet 402 may be configured to receive scattered light 140 that is scattered off of particulate matter 420 in the airflow 120. The scattered light 140 received by the inlet 402 may be within a range of angles from the beam 111. The scattered light 140 received by the inlet 402 may be between approximately 10 to 40 degrees from the beam 111 produced by the laser diode 110. In some embodiments, the scattered light 140 received by the waveguide 414 may be at an angle greater than 10 degrees from the beam 111. The scattered light 140 received by the inlet 402 may be directed through the ellipse mirror toward the outlet 404, where the outlet 404 may direct the scattered light 140 to the photodiode 112. Therefore, the photodiode 112 may measure light that is scattered off of particulate matter 420 within the airflow 120.

The waveguide 414 may also comprise a light trap 415 located within the ellipse mirror. The light trap 415 may be configured to prevent the beam 111 produced by the laser diode 110 from reaching the photodiode 112. In some embodiments, the light trap 415 may comprise one or more angled walls 416 configured to prevent the beam 111 from reflecting back into the pathway of the airflow 120.

FIG. 4B illustrates a detailed view of the waveguide 414. In some embodiments, the light trap 415 may extend through only a portion of the waveguide 414, while in other embodiments, the light trap 415 may extend through the entire waveguide 414. In some embodiments, the light trap 415 may comprise angled walls 416 forming a conical shape within the light trap 415. The conical shape may efficiently trap the beam 111 produced by the laser diode 110. In some embodiments, the interior angled walls 416 may comprise a light absorbing coating or material.

The embodiment shown in FIGS. 4A-4B uses an ellipse mirror as the waveguide 414. However, in other embodiments, additional lenses may be used with the ellipse mirror and positioned around the waveguide 514 to collect even more scattered light from the region of interaction between the beam 111 and particulate matter.

Figure 5:
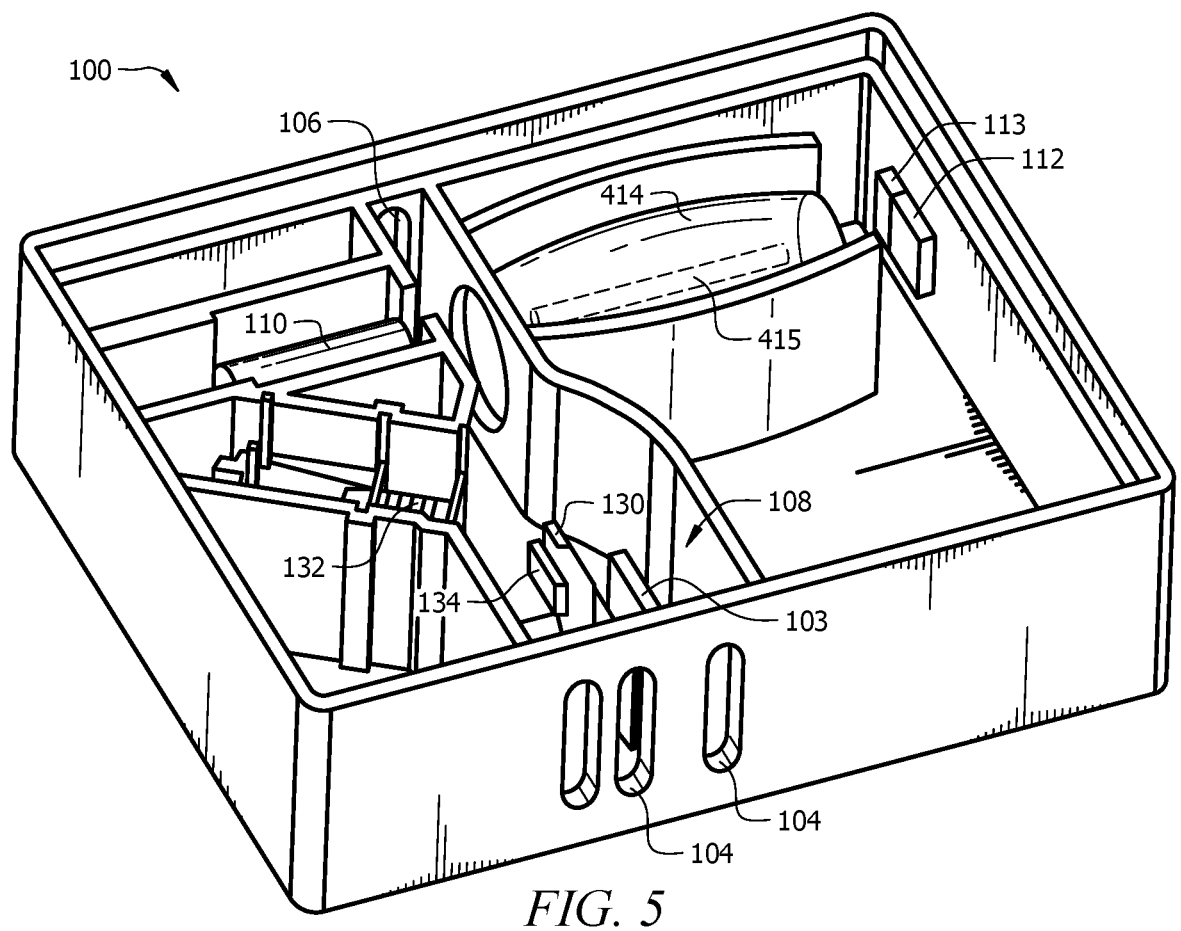
FIG. 5 illustrates a perspective view of a particulate matter sensor according to an embodiment of the disclosure.

FIG. 5 illustrates a perspective view of the sensor 100 with the top of the housing 102 removed, where the waveguide 414 and light trap 415 are incorporated into the sensor 100. The waveguide 414 may be located between the laser diode 110 and the photodiode 112. The waveguide 414 may be at least partially contained by walls within the housing 102. The walls within the housing 102 may be structured to reduce the contact area between the housing 102 and the active area on the surfaces of the waveguide 414. In other words, the housing 102 may be designed to hold the waveguide 414 in place without interfering with the light that is scattered through the waveguides 414.

As described above, the airflow channel 108 may be formed by walls within the housing 102. The inlet 104 may comprise one or more openings in the housing 102. The outlet 106 may comprise one or more openings in the housing 102. The airflow generator of the sensor 100 may comprise a flipper 130, as described above in FIG. 3.

Figure 6:
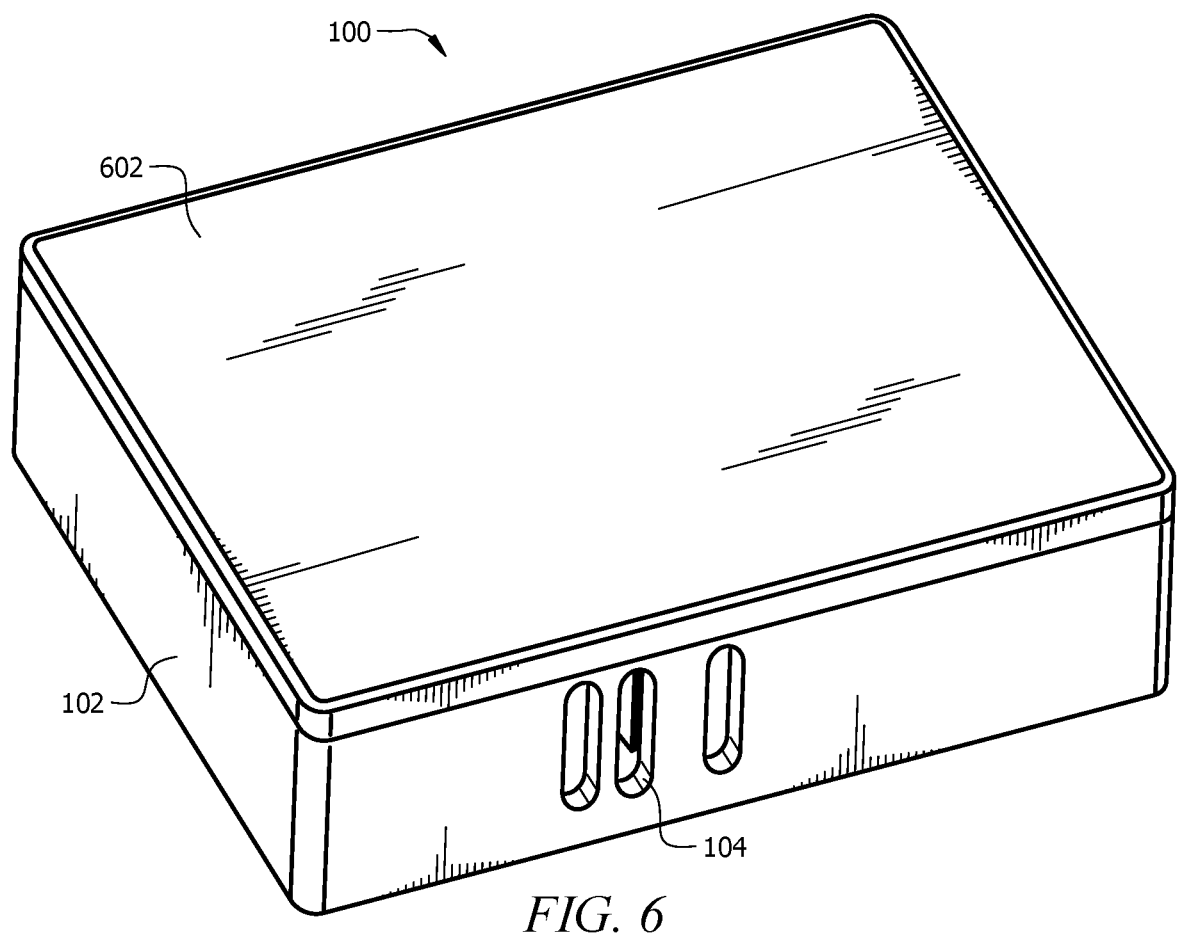
FIG. 6 illustrates an assembled particulate matter sensor according to an embodiment of the disclosure.

FIG. 6 illustrates an assembled particulate matter sensor 100, wherein the housing 102 may comprise a top portion 602 that attaches to the housing 102 and covers the internal elements of the sensor 100.

In a first embodiment, a particulate matter sensor may comprise an airflow channel; a light source configured to pass light through the airflow channel; an airflow generator configured to generate airflow into the airflow channel; a waveguide configured to direct light from the light source after it passes through the airflow channel and scatters off of particulate matter within the airflow channel; a photodiode configured to receive light scattered by the waveguide; and a computing device coupled to the photodiode having a processor and a memory storing instructions which, when executed by the processor, determines a mass concentration of particles in the airflow channel based on an output of the photodiode.

A second embodiment can include the particulate matter sensor of the first embodiment, wherein the waveguide directs light that scatters between approximately 10 and 40 degrees from a beam produced by the light source.

A third embodiment can include the particulate matter sensor of the first or second embodiments, wherein the waveguide directs light that scatters at least 5 degrees from the beam produced by the light source.

A fourth embodiment can include the particulate matter sensor of any of the first to third embodiments, wherein the waveguide directs light that scatters less than 90 degrees from the beam produced by the light source.

A fifth embodiment can include the particulate matter sensor of any of the first to fourth embodiments, wherein light scattered by the particulate matter is forward scattered by the waveguide toward the photodiode.

A sixth embodiment can include the particulate matter sensor of any of the first to fifth embodiments, further comprising a light trap configured to prevent the beam produced by the light source from reaching the photodiode.

A seventh embodiment can include the particulate matter sensor of the sixth embodiment, wherein the light trap is further configured to prevent the beam from reflecting back into the airflow channel.

An eighth embodiment can include the particulate matter sensor of any of the first to seventh embodiments, wherein the sensor is a dust sensor.

A ninth embodiment can include the particulate matter sensor of any of the first to eighth embodiments, wherein the light source is a laser diode.

In a tenth embodiment, a method for determining the concentration of particulate matter within an environment may comprise allowing ambient air to enter a particulate matter sensor; generating an updraft into an airflow channel within the particulate matter sensor; powering a light source within the particulate matter sensor; directing the light source through the airflow channel; receiving, by a waveguide, scattered light that is scattered by particulate matter within the airflow channel; directing, by the waveguide, the scattered light toward a photodiode; and determining a mass concentration of particles in the airflow channel based on an output of the photodiode.

An eleventh embodiment can include the method of the tenth embodiment, wherein the light source comprises a laser diode.

A twelfth embodiment can include the method of the tenth or eleventh embodiments, further comprising directing scattered light within a range of angles from the light source toward the photodiode.

A thirteenth embodiment can include the method of any of the tenth to twelfth embodiments, further comprising preventing a beam produced by the light source from reaching the photodiode.

A fourteenth embodiment can include the method of any of the tenth to thirteenth embodiments, further comprising preventing the light source from directly reaching the photodiode by a light trap located within the waveguide.

A fifteenth embodiment can include the method of the fourteenth embodiment, wherein determining the mass concentration of particles in the airflow channel is completed by a computing device connected to the photodiode.

In a sixteenth embodiment, a particulate matter sensor may comprise an airflow channel; a laser diode; a housing configured to contain the elements of the sensor; an airflow generator configured to generate airflow into the airflow channel; a photodiode configured to receive light produced by the laser diode; a waveguide positioned between the laser diode and the photodiode, configured to direct light scattered by particulate matter within the airflow channel toward the photodiode; and a computing device coupled to the photodiode having a processor and a memory storing instructions which, when executed by the processor, determines a mass concentration of particles in the airflow channel based on an output of the photodiode.

A seventeenth embodiment can include the particulate matter sensor of the sixteenth embodiment, wherein the waveguide directs light that scatters less than 90 degrees from the beam produced by the light source.

An eighteenth embodiment can include the particulate matter sensor of the sixteenth or seventeenth embodiments, further comprising a light trap configured to prevent the beam produced by the light source from reaching the photodiode.

A nineteenth embodiment can include the particulate matter sensor of the eighteenth embodiment, wherein the light trap is further configured to prevent the beam from reflecting back into the airflow channel.

A twentieth embodiment can include the particulate matter sensor of the eighteenth or nineteenth embodiments, wherein the light trap comprises one or more angled surfaces.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A particulate matter sensor comprising:
an airflow channel;
a laser diode for producing a light beam;
an airflow generator configured to generate airflow into the airflow channel;
a photodiode configured to receive light produced by the laser diode;
a solid body waveguide positioned between the laser diode and the photodiode, wherein the solid body waveguide is configured to direct light scattered by particulate matter within the airflow channel toward towards the photodiode, the solid body waveguide defines a concave waveguide inlet surface and a concave waveguide outlet surface, and
wherein the concave waveguide inlet surface is configured to receive light scattered by the particulate matter within the airflow channel and the concave waveguide outlet surface is configured to deliver at least some of the scattered light to the photodiode;
wherein the solid body waveguide extends to and defines one or more side walls of a light collecting lumen that extends at least partially through the solid body waveguide from the concave waveguide inlet surface toward the concave waveguide outlet surface and forms an opening through the concave waveguide inlet surface, wherein the opening through the concave waveguide inlet surface is aligned with the light beam of the laser diode; and
a computing device coupled to the photodiode having a processor and a memory storing instructions which, when executed by the processor, determines a mass concentration of particles in the airflow channel based on an output of the photodiode.

2. The particulate matter sensor of claim 1, wherein the solid body waveguide directs light that scatters in the range of 10 to 40 degrees from the light beam produced by the laser diode.

3. The particulate matter sensor of claim 1, wherein the solid body waveguide has a length between the concave waveguide inlet surface and the concave waveguide outlet surface along the light collecting lumen, and wherein the light collecting lumen extends along at least a majority of the length of the solid body waveguide.

4. The particulate matter sensor of claim 3, further comprising a light absorbing coating on the solid body waveguide, wherein the light absorbing coating is on one or more of the side walls of the light collecting lumen defined by the solid body waveguide.

5. A particulate matter sensor comprising:
a light source configured to produce a light beam;
a photodiode configured to receive light produced by the light source; and
a solid body waveguide positioned between the light source and the photodiode, the solid body waveguide configured to direct light scattered by particulate matter towards the photodiode, wherein the solid body waveguide comprises a solid body that defines a waveguide inlet surface, a waveguide outlet surface,
wherein the solid body waveguide is configured to receive light scattered by the particulate matter via the waveguide inlet surface into the solid body of the waveguide, wherein at least a portion of the received scattered light is directed out the waveguide outlet surface toward the photodiode;
wherein the solid body waveguide extends to and defines one or more side walls of a light collecting lumen that extends at least partially through the solid body waveguide from the waveguide inlet surface toward the waveguide outlet surface and forms an opening through the waveguide inlet surface, wherein the opening through the waveguide inlet surface is aligned with the light beam of the laser diode; and
a coating on the solid body waveguide, wherein the coating is on one or more of the side walls of the light collecting lumen defined by the solid body waveguide.

6. The particulate matter sensor of claim 5, further comprising a computing device, coupled to the photodiode, having a processor and a memory storing instructions which, when executed by the processor, determines a mass concentration of the particulate matter in the particulate matter sensor based on an output of the photodiode.

7. The particulate matter sensor of claim 5, further comprising:
an airflow channel; and
an airflow generator configured to generate airflow in the airflow channel.

8. The particulate matter sensor of claim 5, wherein the solid body waveguide has a length between the waveguide inlet surface and the waveguide outlet surface along the light collecting lumen, and wherein the light collecting lumen extends along at least a majority of the length of the solid body waveguide.

9. The particulate matter sensor of claim 5, wherein the solid body waveguide is configured to receive light scattered between a range of 10 to 40 degrees from the light beam.

10. The particulate matter sensor of claim 5, wherein the light source is a laser diode.

11. The particulate matter sensor of claim 5, wherein the solid body waveguide comprises one or more lens.

12. The particulate matter sensor of claim 11, wherein the solid body waveguide comprises an ellipse mirror on an outer surface.

13. The particulate matter sensor of claim 11, wherein the light collecting lumen includes one or more angled side walls.

14. The particulate matter sensor of claim 13, wherein one or more of the angled side walls includes a light absorbing coating.

\* \* \* \* \*